March 14, 1933.  S. H. HALE  1,901,099
CUTTER MECHANISM FOR CORN HARVESTERS
Filed April 11, 1930  4 Sheets-Sheet 1

INVENTOR,
Stephen H. Hale
BY
ATTORNEY.

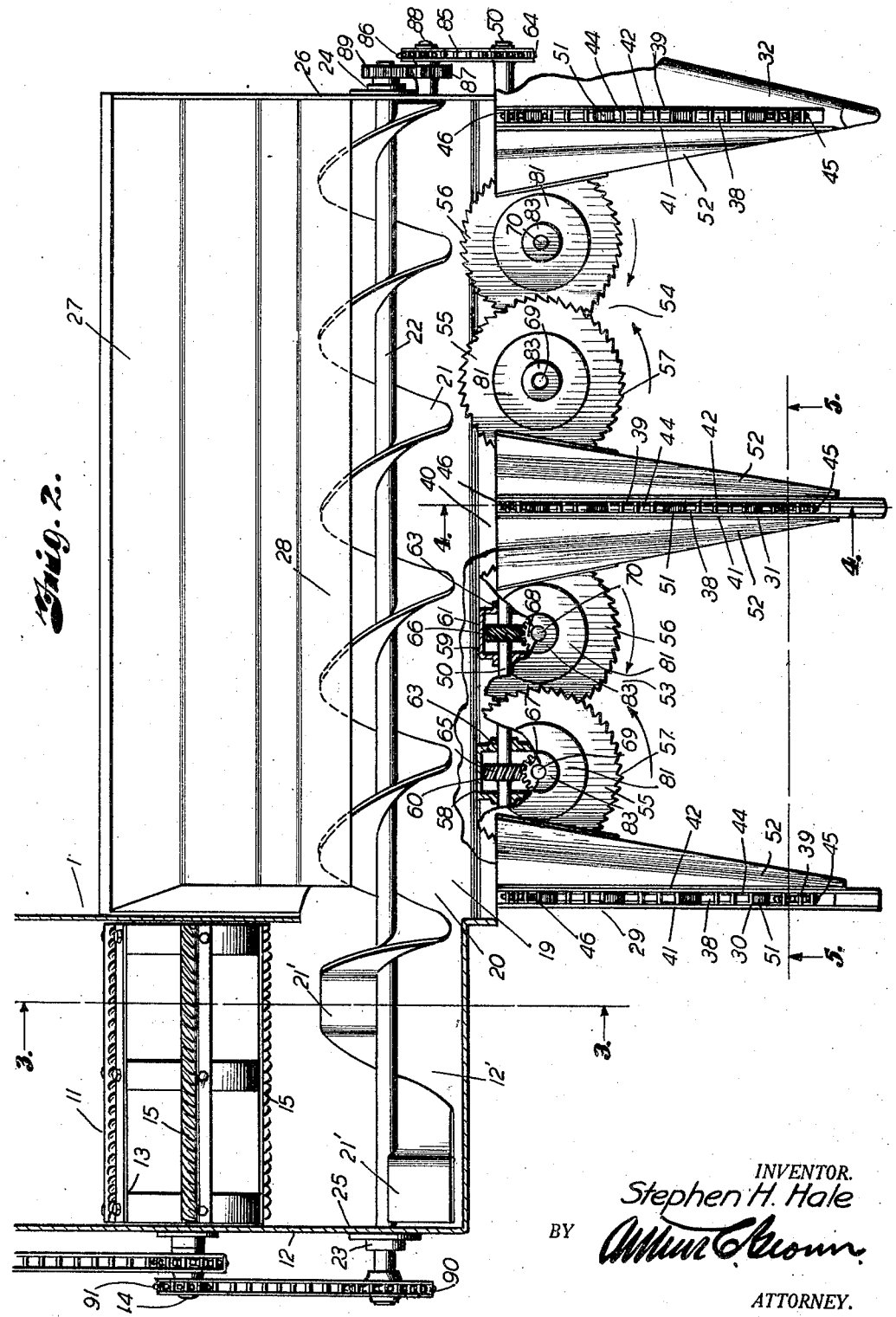

March 14, 1933.  S. H. HALE  1,901,099
CUTTER MECHANISM FOR CORN HARVESTERS
Filed April 11, 1930  4 Sheets-Sheet 3
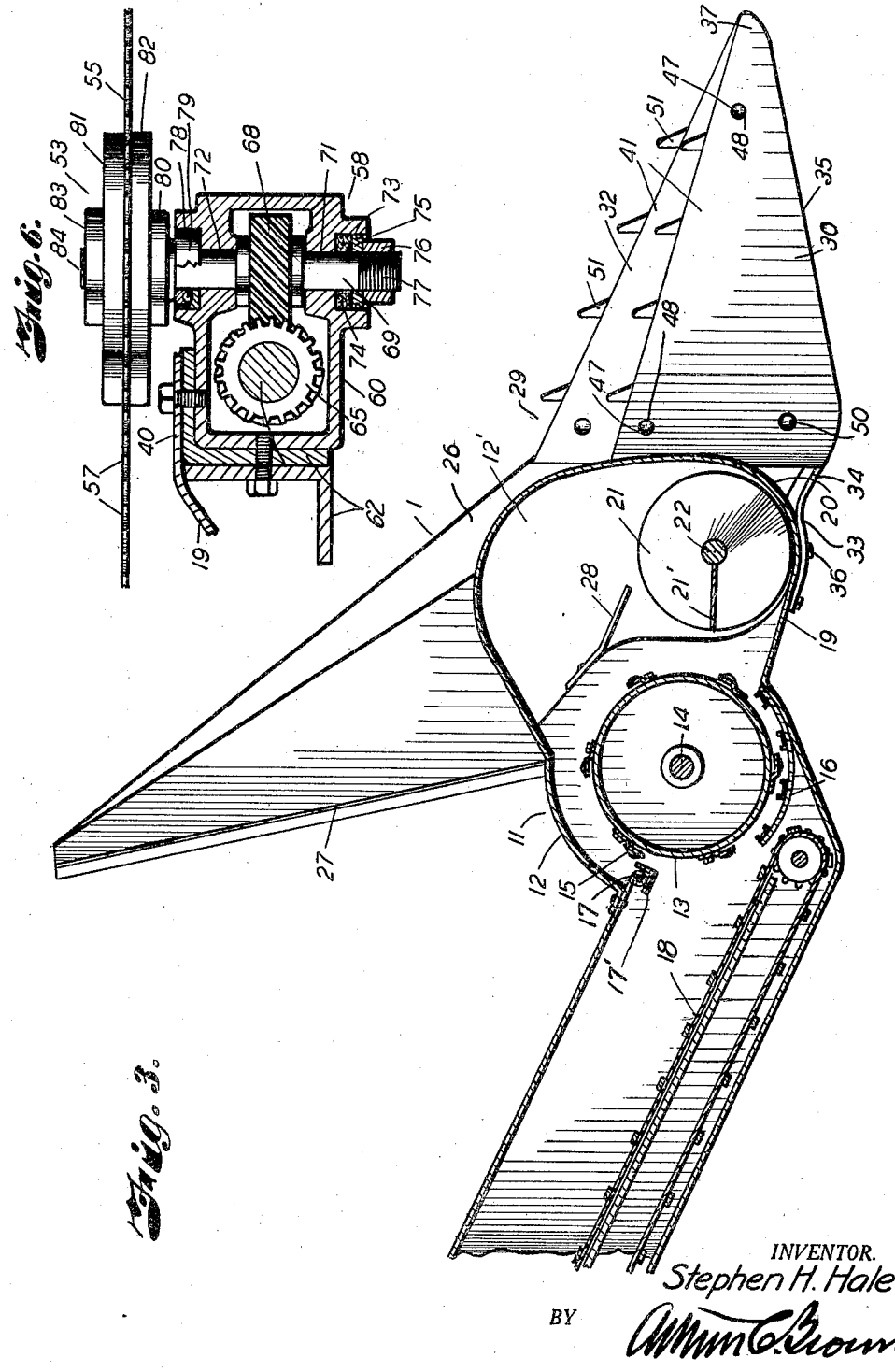
INVENTOR.
Stephen H. Hale
BY
ATTORNEY.

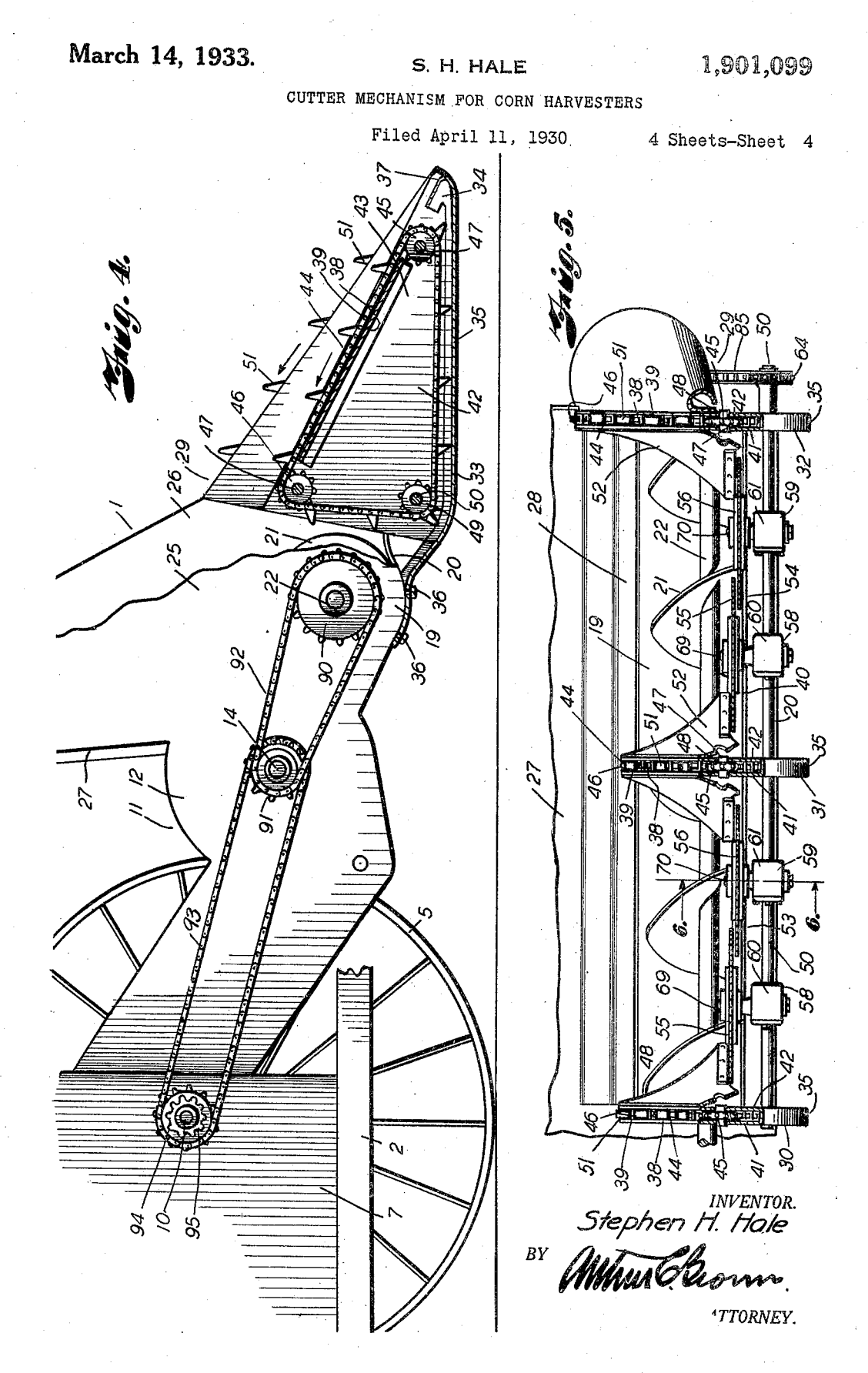

March 14, 1933.  S. H. HALE  1,901,099
CUTTER MECHANISM FOR CORN HARVESTERS
Filed April 11, 1930  4 Sheets-Sheet 4

INVENTOR.
Stephen H. Hale
BY
ATTORNEY.

Patented Mar. 14, 1933

1,901,099

UNITED STATES PATENT OFFICE

STEPHEN H. HALE, OF KANSAS CITY, MISSOURI, ASSIGNOR, BY MESNE ASSIGNMENTS, TO GLEANER HARVESTER CORPORATION, OF INDEPENDENCE, MISSOURI, A CORPORATION OF DELAWARE

CUTTER MECHANISM FOR CORN HARVESTERS

Application filed April 11, 1930. Serial No. 443,363.

My invention relates to machines for harvesting corn or like grain, and has for its principal object to provide improved gathering and cutting mechanism for a machine of that type, whereby relative thick, high stalks, and fallen stalks may be gathered, cut, and delivered to threshing mechanism with a minimum loss of grain and minimum strain on the machine.

In accomplishing this and other objects of the invention, I have provided improved details of structure, the preferred form of which is illustrated in the accompanying drawings, wherein:

Fig. 2 is a plan view of the machine illustrating the relation of the cutter mechanism with the thresher unit of the machine, parts being broken away for better illustration.

Fig. 3 is a section on the line 3—3, Fig. 2, particularly illustrating the mounting of the cutter mechanism.

Fig. 4 is a section on the line 4—4, Fig. 2, illustrating the mounting of the grain feeder belt.

Fig. 5 is a front elevation of the cutter mechanism partly broken away for better illustration.

Fig. 6 is a section on the line 6—6, Fig. 5, illustrating the mounting of the cutter members.

Figure 1:
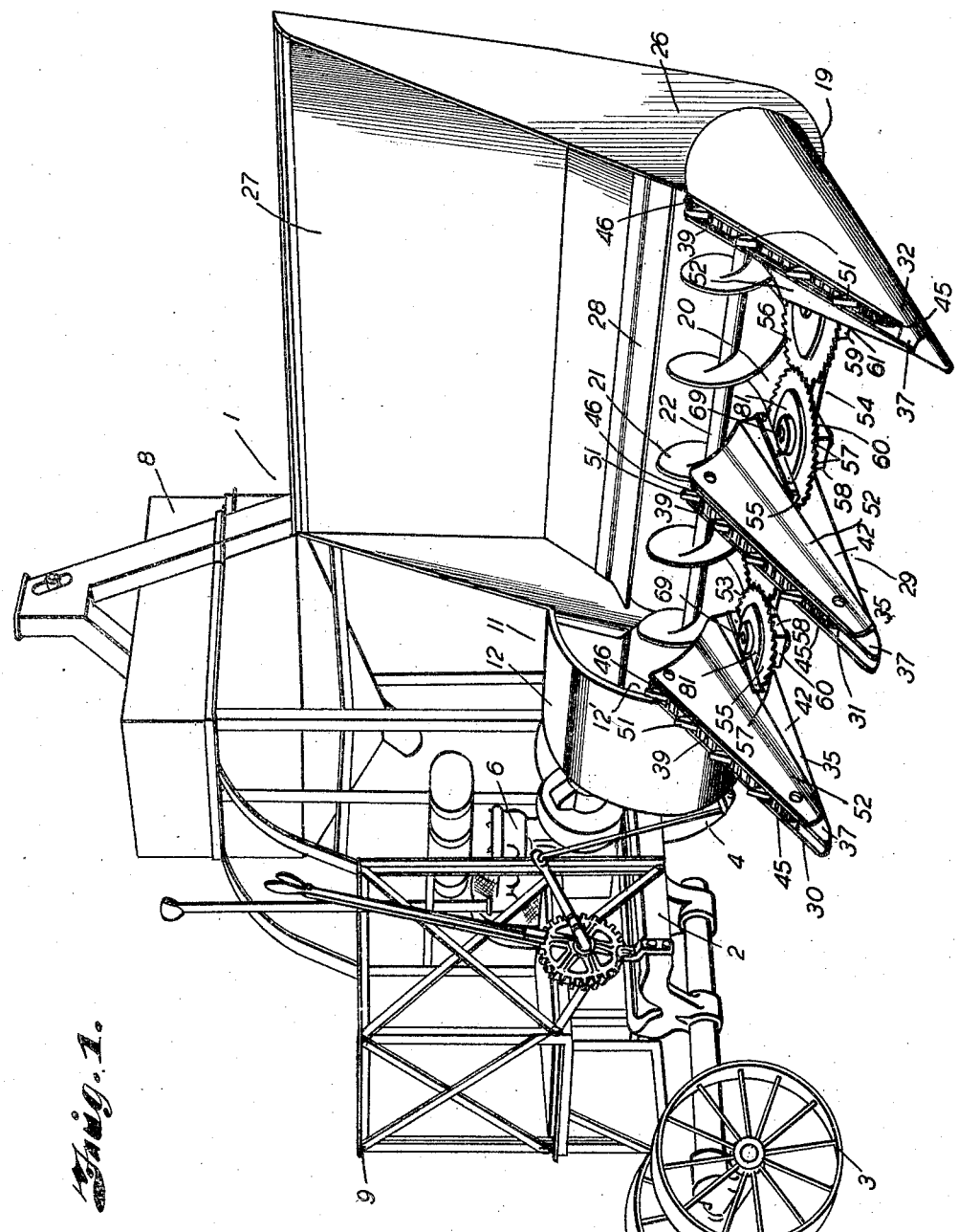
Fig. 1 is a perspective view of a combine harvesting machine equipped with my improved cutter mechanism.

Referring in detail to the drawings:

1 designates a combine harvester machine including a main frame 2 portably supported on wheels 3, 4, and 5, and carrying a power plant 6, a separator unit 7, a grain bin 8, and an operator's platform 9 from which the various operations of the machine may be observed and controlled.

Pivotally mounted on a shaft 10 carried by the separator unit 7 and extending forwardly from the main frame 2 is a thresher unit 11 including a housing 12 enclosing a thresher cylinder 13, shown as of rasp type, rotatable on a shaft 14 carried by the side walls of the housing 12, and having rasp bars 15 cooperative with a concave 16, the forward end of the housing being employed to form a cylinder feeding chamber 12', and supported from the wall of the housing by a cross bar 17 is an angle member 17' cooperating with the cylinder for deflecting threshed grain from the cylinder onto an endless belt conveyor 18 whereby the grain is delivered to the separator unit.

Extending laterally from and connecting with the forward end of the thresher housing 12 and connecting with the cylinder feeding chamber 12' is a harvester pan 19 having a concave bottom 20 fitted with a helical conveyor 21 including a shaft 22 journalled in bearings 23 and 24 on the end walls 25 and 26 of the housing 12 and harvester pan 19 respectively, and terminating within the cylinder feeding housing in beater blades 21' adapted for deflecting cut grain into the threshing cylinder. The rear portion of the harvester pan is extended upwardly and rearwardly to form a back board 27 of sufficient height to gather stalks of corn and fitted with a longitudinal baffle plate 28 cooperative with the helical conveyor to direct cut grain from the reaper apparatus, generally designated 29, longitudinally through the pan toward the thresher housing.

Extending forwardly from the harvester pan 19 are divider members 30, 31 and 32 equally spaced apart to conform to the standard spacing of rows of corn and adapted for separating the rows and guiding the stalks into the cutter mechanism.

The divider members are substantially triangular in shape, each including a supporting frame 33 (Fig. 4) comprising a channel member 34 having a runner portion 35 secured at its rear to the harvester pan 19 by bolts 36 and bent upwardly and rearwardly at its forward end to form a nose portion 37 and an upwardly and rearwardly inclined rail portion 38 for supporting carrier belts 39.

Attached to opposite sides of the channel frame member 34 and to the lip 40 of the harvester pan 19 are side plates 41 and 42 forming a housing chamber 43 for the carrier belts, and having their upper inclined edges spaced above the rail portion 38 of the frame 33 to form a guide way 44 for the carrier belts 39.

45 and 46 designate idler sprocket wheels mounted in each divided member between the side plates 41 and 42, adjacent the nose portion 37 and the upper rearward end of the member carried by stub shafts 47 rotatable in bearing openings 48 in the side plates, 49 a drive sprocket also mounted between the side plates on a drive shaft 50 adjacent the lower rearward end of the divider board, and the carrier belts 39 run over said sprocket wheels within the housing chamber, the sprockets 45 and 49 being spaced above the runner portion 35 of the frame 33 sufficiently to provide clearance for impeller fingers 51 equally spaced on the carrier belts 39 and adapted for engaging stalks of corn for delivery to the harvester pan.

Attached to and extending laterally from both sides of interior divider boards and from the inner sides of end divided boards, are guide wings 52, the upper edges of the wings being secured to the side plates 41 and 42 and the lower edges of the wings being tapered outwardly from the nose portions 37 of the divider members toward the rear ends of the members for lifting fallen stalks of corn from the ground onto the carrier belts 39 whereby the stalks may be delivered to cutter units 53 and 54 located adjacent the grain pan 19 and centrally between paired faces of the divider boards.

The cutter units 53 and 54 are identical in construction, each including a pair of horizontal, circular cutter members 55 and 56 preferably provided with peripheral teeth 57, and rotatable in opposite directions and at different speeds by gear trasmission units 58 and 59 respectively, operable by the drive shaft 50.

The transmission units 58 and 59 include housing members 60 and 61 secured to double angle brackets 62 below the lip 40 of the harvester pan and having horizontal bearing openings 63 journaling the drive shaft 50 which extends transversely through the divided boards to carry the drive sprockets 49 and beyond the end wall 26 of the harvester pan to carry a sprocket 64 having operable connection with the helical conveyor shaft 22 as hereafter described.

Fixed on the drive shaft 50 within the housing members 60 and 61 are helical gears 65 and 66 substantially equal in diameter, but having their helices or teeth arranged oppositely and at different angles so that one of the gear members, and preferably the gear member 65 in the housing 60, will have its helices disposed at a lesser angle than that of the gear member 66 for accommodating a substantially greater number of teeth on its periphery than on the gear member 66, the members being adapted for meshing with helical gears 67 and 68 fixed on vertically disposed shafts 69 and 70.

The gears 67 and 68 are substantially equal in diameter and in number of teeth, so that the variation in number of teeth or helices on the gears 65 and 66 will cause a corresponding variation in the rate of rotation imparted to the gears 67 and 68, the greater number of teeth on the gear 65 causing a higher rate of rotation to be imparted to the gear 67 than to the gear 68, and the opposite arrangement of the helices on the gears causing the shafts 69 and 70 to be rotated in opposite directions.

The shafts 69 and 70 extend through bearing openings 71 and 72 in the top and bottom walls of their housings, each lower opening having a counterbore 73 forming a chamber in which packing 74 is retained by an oil seal ring 75 and a nut 76 on the threaded lower end 77 of the shaft whereby lubricant is prevented from escaping from the gear housing.

The upper bearing opening 72 is provided with a counterbore 78 fitted with an anti-friction thrust bearing 79 for a collar 80 integral with the shaft, the counterbores being located in bosses of different heights on the respective housing members to permit the outer portion of the cutter member 55 to overlie the cutter member 56. The faster moving cutting member is preferably arranged to rotate anti-clockwise (from the front of the machine) to effect delivery of cut stalks of corn into the harvester pan 19 in the direction of the threshing mechanism.

The cutter members 55 and 56 are assembled on the upper ends of the shafts 69 and 70 between a pair of clamping disks 81 and 82 supported on the thrust collars 80 and urged into clamping relation with the cutter members by a nut 83 engaged on the threaded upper ends 84 of the shafts.

In order that the drive shaft 50 for actuating the carrier belts 30 and cutter units 53 and 54 may operate at proper proportionate speeds relative to the helical conveyor shaft 22 and in the desired direction to cause proper movement of the carrier belts as indicated in Fig. 4, and for rotation of the cutter members in anti-clockwise and clockwise directions as indicated in Fig. 2, the sprocket 64 on the drive shaft 50 is connected by a chain belt 85 with a drive sprocket 86 in fixed driving relation with a gear 87, and is rotatable on a stub shaft 88 supported by the end wall 26 of the harvester pan 19. The gear 87 meshes with a gear member 89 on the helical conveyor shaft 22, so that clockwise rotation of the helical conveyor shaft transmitted through the gear and chain belt 85 causes opposite or anti-clockwise rotation of the drive shaft.

The opposite or inner end of the helical conveyor shaft 22 is fitted with a sprocket 90 operably connected with a sprocket 91 on the cylinder shaft 14 by a chain belt 92 and the cylinder shaft is operably connected by a chain belt 93 with a sprocket 94 on the pivot shaft 10. The pivot shaft is fitted with a sprocket 95 for connection with the power plant 6 whereby the reaper, thresher and separator units of the combine harvesting machine are driven for performing the reaping, threshing and cleaning operation in successive stages as the machine is drawn through a field by a tractor or other draft means.

In using a combine machine equipped with my improved cutter mechanism when the machine in propelled through a field of standing grain, and power from the power plant 6 on the machine is transmitted through the chain belts 93, 92, conveyor shaft 22, gear members 89 and 87, sprockets 86 and 64, chain belt 85, drive shaft 50, and helical gears 65 and 66, the cutter members 55 and 56 are rotated in opposite directions and at different speeds cutting the stalks and directing the lower ends of the cut stalks into the harvester conveyor pan 19 in the direction of the threshing cylinder, the carrier belts cooperating with the divider boards to lift fallen stalks to the cutter members, and the high back board gathering the upper ends of the stalks and retaining the stalks within the field of the conveyor.

When the stalks reach the feeding chamber at the front of the cylinder housing the beaters on the end of the helical conveyor direct the stalks into the cylinder where the grain is shelled and delivered onto the conveyor for separation from the stalks and stover by suitable ordinary mechanism (not shown) and eventually delivered to the grain bin by elevator mechanism of usual construction.

It is apparent that with a machine such as I have described no reel is required and that substantially complete harvesting of a crop is assured by my improved arrangement of the cutters and their combination with the gathering mechanism.

What I claim and desire to secure by Letters Patent is:

1. In combination with a longitudinal conveyor, cutter mechanism including rotary cutter members having teeth inclined in their direction of rotation and means for rotating said members at different peripheral speeds to direct cut material toward one end of the conveyor.

2. In combination with a conveyor, cutter mechanism including cooperating rotary cutter members having teeth inclined in the direction of the cutter rotation, and means for rotating said members at different peripheral speeds to direct cut material toward the discharge end of the conveyor.

3. In combination with a longitudinal conveyor, cutter mechanism including coperating rotary cutter members provided with saw teeth, and means for rotating said members at different cutting speeds to direct cut material toward one end of the conveyor.

4. In combination with a conveyor, cutter mechanism including oppositely rotatable horizontal cutter members having saw teeth and means for rotating said members at different constant peripheral speeds to direct cut material toward the discharge end of the conveyor.

5. In combination with a longitudinal conveyor, cutter mechanism including paired rotary cutter members arranged in parallel relation to the conveyor and having peripheral teeth inclined in the direction of their rotation and means for rotating said members in opposite directions and at different peripheral speeds to direct cut material toward one end of the conveyor.

6. In combination with a conveyor, cutter mechanism including rotary members having circular cutting edges provided with forwardly inclined teeth, and means for rotating said members in opposite directions and at different peripheral speeds to direct cut material toward the discharge end of the conveyor.

7. In combination with a longitudinal conveyor, cutter mechanism including circular cutter members having overlapping peripheral toothed cutting edges arranged to draw a stalk into the cutters, and means for rotating the cutter members in opposite directions and at different peripheral speeds to direct cut material toward one end of the conveyor.

8. In combination with a conveyor, cutter mechanism including circular cutter members having parallel axes and overlapping peripheral cutting edges provided with oppositely inclined teeth, and means for rotating the cutter members at different peripheral speeds to direct cut material toward the discharge end of the conveyor.

9. In combination with a longitudinal conveyor, cutter mechanism including paired disks having parallel axes and overlapping peripheral cutting edges provided with oppositely inclined teeth, driven shafts coaxial with said disks, a drive shaft parallel to the conveyor, and means operably connecting the drive shaft with the driven shafts for effecting rotation of the disks in opposite directions and at different speeds to direct cut material toward one end of the conveyor.

10. In combination with a longitudinal conveyor, cutter mechanism including a support, spaced driven shafts on the support having parallel axes, overlapping disk members on said shafts having oppositely directed forwardly inclined serrated cutting edges, a drive shaft parallel to the conveyor, and gear members operably connecting the drive shaft with the driven shafts for effecting rotation of the disks in opposite directions and at different peripheral speeds to direct cut material toward one end of the conveyor.

11. In combination with a conveyor, cutter mechanism of the character described including a support, a drive shaft on the support, driven shafts on the support extending transversely of the drive shaft and in parallel spaced relation, circular cutter members on said driven shafts in overlapping relation and having peripheral cutting edges provided with oppositely inclined serrations, driven gears on said driven shafts, and drive gears of varying diameters on the drive shaft engaging the driven gears for rotating the cutter members in opposite directions and at different speeds to direct cut material toward the discharge end of the conveyor.

12. In combination with a longitudinal conveyor, cutter mechanism of the character described including a support, a drive shaft on the support, driven shafts on the support extending transversely of the drive shaft and in parallel spaced relation, cutter members on the driven shafts having teeth inclined in their direction of rotation, helical driven gears on said driven shafts, and helical drive gears on the drive shaft engaging the driven gears and having an unequal number of helices for effecting rotation of the cutter members at different speeds to direct cut material toward one end of the conveyor.

In testimony whereof I affix my signature.

STEPHEN H. HALE.